US009207842B2

(12) United States Patent
Bennetts et al.

(10) Patent No.: US 9,207,842 B2
(45) Date of Patent: Dec. 8, 2015

(54) AUTOMATICALLY PLAYING A VIDEO CLIP ASSOCIATED WITH AN ICON THAT IS IN FOCUS

(75) Inventors: Christopher L. Bennetts, Hsin Tien (TW); Christopher W. Larsen, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1380 days.

(21) Appl. No.: 11/745,397

(22) Filed: May 7, 2007

(65) Prior Publication Data
US 2008/0282193 A1  Nov. 13, 2008

(51) Int. Cl.
*G06F 3/0484* (2013.01)

(52) U.S. Cl.
CPC ................. *G06F 3/04842* (2013.01)

(58) Field of Classification Search
CPC .................................. G06F 3/04842
USPC ................................. 715/835, 720
See application file for complete search history.

(56) References Cited

U.S. PATENT DOCUMENTS

| 2001/0030660 | A1 | 10/2001 | Zainoulline | |
|---|---|---|---|---|
| 2002/0173299 | A1* | 11/2002 | Buchholz et al. | 455/418 |
| 2004/0054964 | A1* | 3/2004 | Bozdagi et al. | 715/500.1 |
| 2004/0107439 | A1* | 6/2004 | Hassell et al. | 725/44 |
| 2004/0267736 | A1* | 12/2004 | Yamane et al. | 707/3 |
| 2005/0235210 | A1 | 10/2005 | Peskin et al. | |
| 2006/0074869 | A1 | 4/2006 | Rosenberg et al. | |
| 2006/0294476 | A1 | 12/2006 | Buckley | |
| 2007/0239819 | A1* | 10/2007 | Woods et al. | 709/201 |
| 2008/0034325 | A1* | 2/2008 | Ording | 715/838 |
| 2008/0127266 | A1* | 5/2008 | Ward et al. | 725/42 |

FOREIGN PATENT DOCUMENTS

| KR | 10-2006-0048766 A | 5/2006 |
|---|---|---|
| WO | 98/26596 A1 | 6/1998 |
| WO | 03/079133 A3 | 9/2003 |

OTHER PUBLICATIONS

HPDC, PCT International Search Report mailed Sep. 30, 2008, PCT Application No. PCT/US2008/005706, 10 pp.
GB Intellectual Property Office, Examination Report under Section 18(3), Appln No. 0919522.3, date of mailing Apr. 18, 2011, 4 p.
Manual for HP 730 series digital cameras, 2003, see e.g. pp. 45 and 48, http://ec1.images-amazon.com/media/i3d/01/A/man-migrate/MANUAL000004071.pdf.

* cited by examiner

*Primary Examiner* — Andrea Leggett
(74) *Attorney, Agent, or Firm* — Conley Rose

(57) ABSTRACT

A system comprises a display and logic coupled to the display. The logic automatically begins playing a video clip associated with an icon that is in focus on the display.

19 Claims, 7 Drawing Sheets

AUTOMATICALLY PLAYING A VIDEO CLIP ASSOCIATED WITH AN ICON THAT IS IN FOCUS

BACKGROUND

It is possible for a user of a computer to select on-line media content to be downloaded and played on the user's computer. An increasing array of media content choices are available to users. Managing the array of choices in a user-friendly and intuitive manner is a concern.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. The term "system" refers to a combination of two or more components. A system may comprise, for example, a computer, a combination of computers, or a subsystem within a computer.

DETAILED DESCRIPTION

Figure 1:
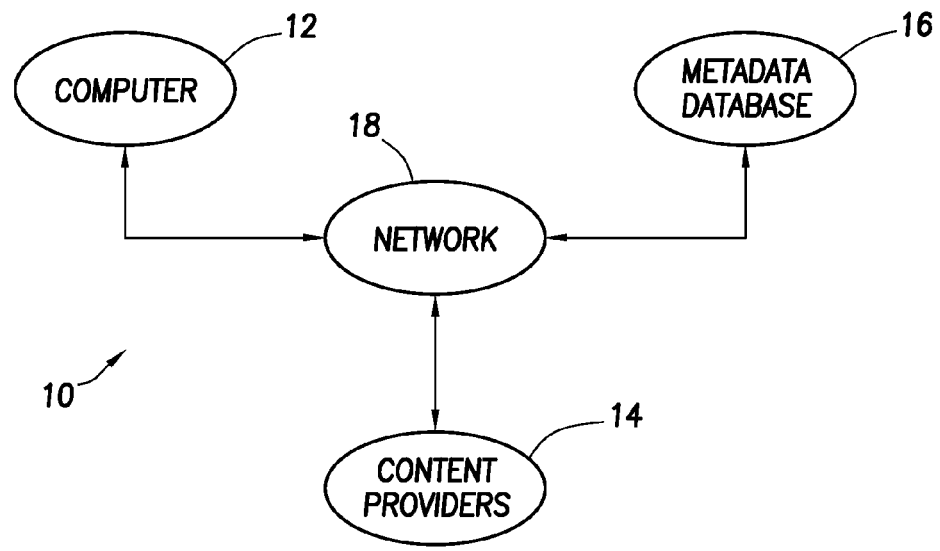
FIG. 1 shows a system in accordance with embodiments of the invention.

FIG. 1 shows a system 10 in accordance with various embodiments. As shown, system 10 comprises a computer 12 communicatively coupled to a metadata database 16 and one or more content providers 14 via a network 18. In various embodiments, the network 18 comprises a local area network (LAN), a wide area network (WAN) or any other suitable network. In some embodiments, network 18 comprises the internet. The metadata database 16 is hosted on a computer and associated with media content provided by the content providers 14. A user of computer 12 causes the computer 12 to retrieve or otherwise download metadata from the metadata database 16 through the network 18. The metadata downloaded to the computer 12 facilitates a user's choice of media content to be downloaded from content providers 14.

In some embodiments, the media content comprises video, audio, or combinations of video and audio. In some embodiments the media content comprises video on demand (VOD), a streamcast, or other types of media content.

Figure 2:
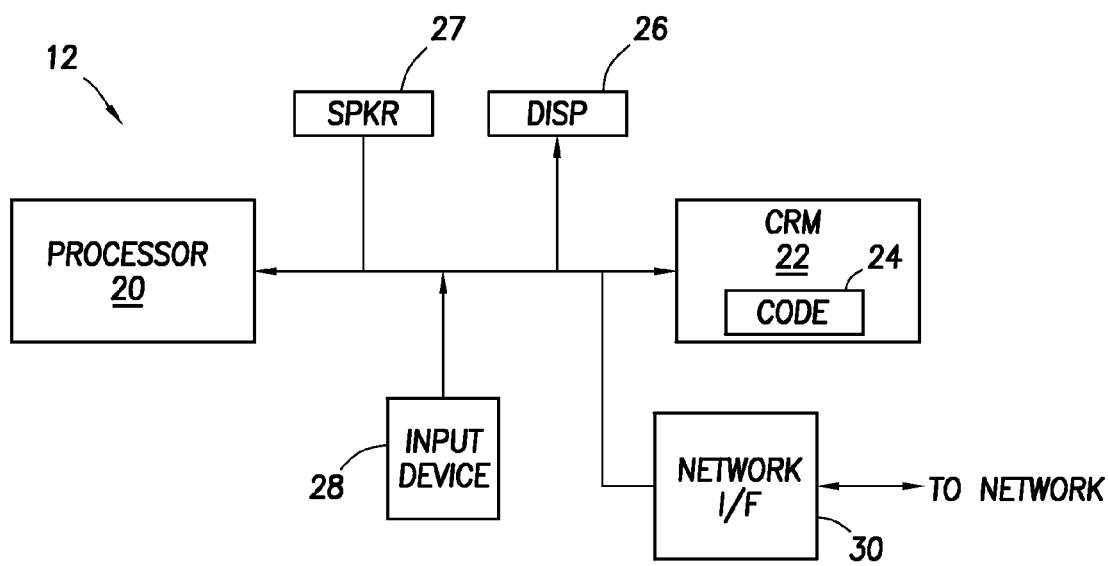
FIG. 2 shows an embodiment of a computer usable in the system of FIG. 1.

FIG. 2 shows an illustrative embodiment of computer 12. The embodiment shown in FIG. 2 is also applicable to the computer that hosts the metadata database 16 as well as the content providers 14. As shown in FIG. 2, computer 12 comprises a processor 20 coupled to a computer-readable medium (CRM) 22, a display 26, speaker 27, on and input device 28, and a network interface 30. The computer-readable medium 22 comprises any suitable type of volatile memory (e.g., random access memory), non-volatile memory (e.g., hard disk drive, flash memory, read-only memory, compact disk read-only memory, etc.), or combinations thereof. The computer-readable medium 22 stores code 24 that is executable by processor 20. In at least some embodiments, the processor 20 executing code 24 comprises logic that causes the computer 12 to perform some or all of the functionality described herein attributable to computer 12.

A user of the computer 12 interacts with the computer by using at least the input device 28 and display 26. In some embodiments, the input device 28 comprises a keyboard, mouse, track ball, or other type of pointing device. The computer 12 communicates with the metadata database 16 and content providers 14 via the network interface 30. Metadata from the metadata database 16 and media content from the content providers 14 are received by the computer 12 via the network interface 30. In some embodiments such information is stored in the computer-readable medium 22. When desired, however, the metadata and media content are played to the user via display 26 and speaker 27.

Figure 3:
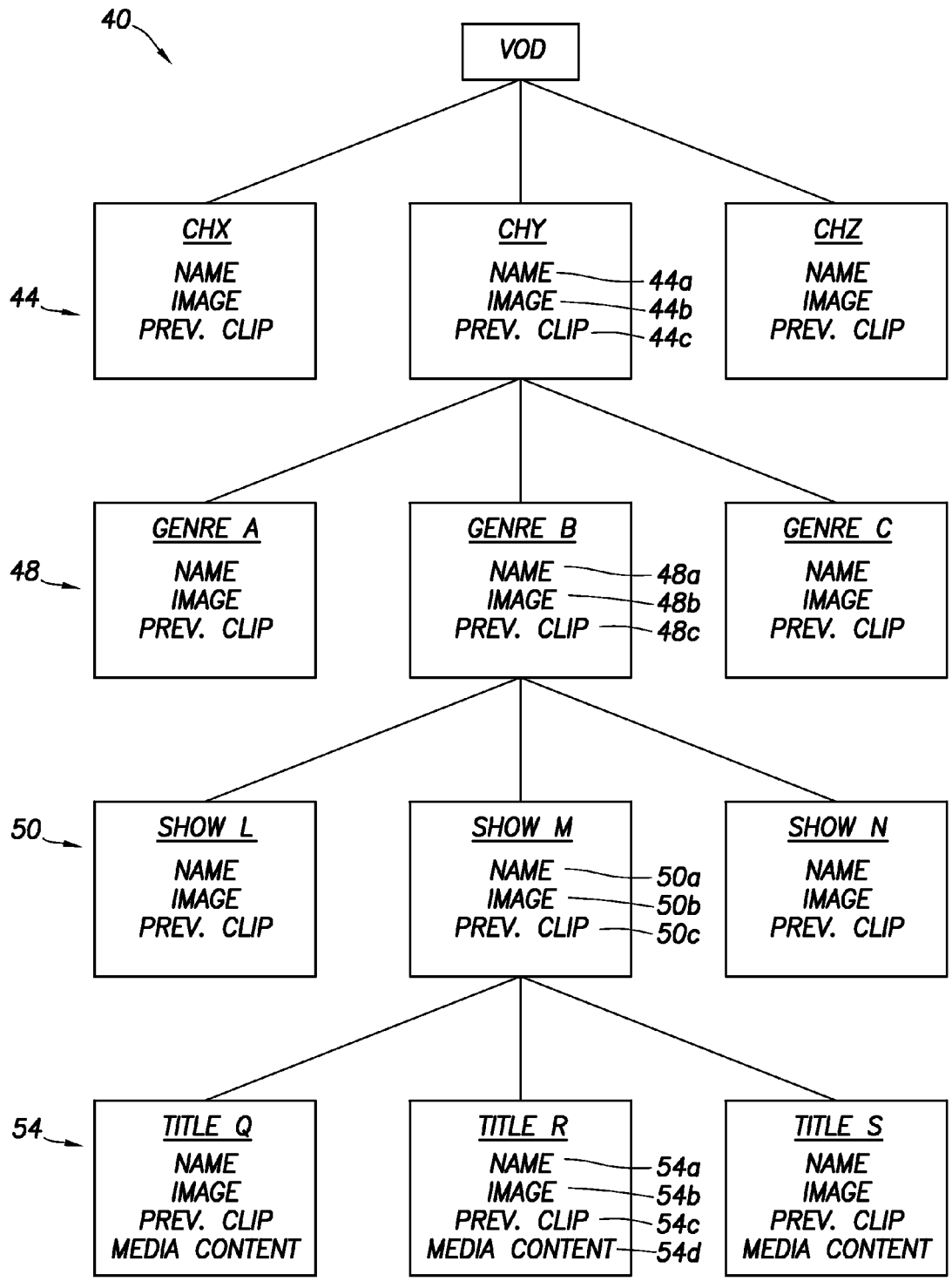
FIG. 3 shows an example of metadata stored in, and usable by, the system of FIG. 1.

FIG. 3 shows an embodiment of the metadata stored in metadata database 16. The metadata 40 illustrated in FIG. 3 comprises metadata pertaining to VOD content. FIG. 3 illustrates an illustrative hierarchy by which the metadata is organized. The particular hierarchy illustrated in FIG. 3 comprises multiple levels 44, 48, 50, and 54. At the top level 44, the metadata comprises information about various channels such as channels X, Y, and Z as shown. Each channel X, Y, Z comprises a channel that is selectable by user of computer 12 for playback on the computer. The metadata associated with each channel X, Y, Z comprises, for example, name 44a, image 44b, and a preview clip 44c. The name 44a of the channel comprises an alphanumeric name associated with that particular channel. The image 44b comprises a graphical image that is displayed on display 26 for graphically identifying the associated channel.

The preview clip 44c in the metadata comprises an identifier of a location at which a clip associated with the channel is stored to be played back to the user of computer 12. In other embodiments, the metadata's preview clip is the clip itself, not just an identifier of the clip. In at least some embodiments, the preview clip does not comprise the full media content and is generally shorter in duration than the full media content associated with that channel. In some embodiments, the preview clip comprises an advertisement, or a first portion of the media content (e.g., the first two minutes of the channel's media content).

Hierarchy level 48 comprises genre information about one or more of the channels X, Y, Z. As shown in FIG. 3, genre A, B, and C are associated with channel Y. Each genre identifies a different type of media content. Examples of different genre types comprise comedy, drama, horror, etc. Each genre metadata at hierarchy level 48 also comprises a name 48a, image 48b, and preview clip 48c. The name 48a of the genre identifies the genre. The image 48b of the genre comprises a graphical image associated with the genre to be displayed on display 26 of the user's computer 12. Each genre also comprises a preview clip that can be played to provide the user with additional information about that particular genre. As with each channel, the preview clip 48c of the genre generally comprises a relatively short video clip such as an advertisement and may comprise a first portion of media content associated with the channel to which the genre pertains.

Hierarchy level 50 comprises one or more shows associated with each genre type. As shown in FIG. 3, genre B is associate with shows L, M, and N. Thus, shows L, M, and N are shows in the genre of genre B. As with hierarchy levels 44 and 48, the metadata associated with each show at hierarchy level 50 also comprises a name 50a, image 50b, and preview clip 50c. The name 50a of each show identifies each show to the user of computer 12, the image 50b comprises a graphical image associated with that particular show. Further, the preview clip 50c comprises a relatively short video clip associated with that show. The preview clip may comprise an advertisement or the first portion of the underlying media content associated with that show.

Each show may comprise one or more titles, (e.g., episodes). Accordingly, hierarchy level 54 in FIG. 3 comprises one or more titles associated with each show. In the example of FIG. 3, show M is associated with titles Q, R, and S. The metadata associated with each title comprises a name 54a, image 54b, preview clip 54c, and an identifier of the full media content associated with that title. The name 54a of each title identifies the title to the user. The image 54b comprises a graphical image associated with that particular title. The preview clip 54c comprises a relatively short video clip, as described above, of that title. The media content comprises an identifier at which the media content of that particular title can be found on a content provider 14.

Figure 4:
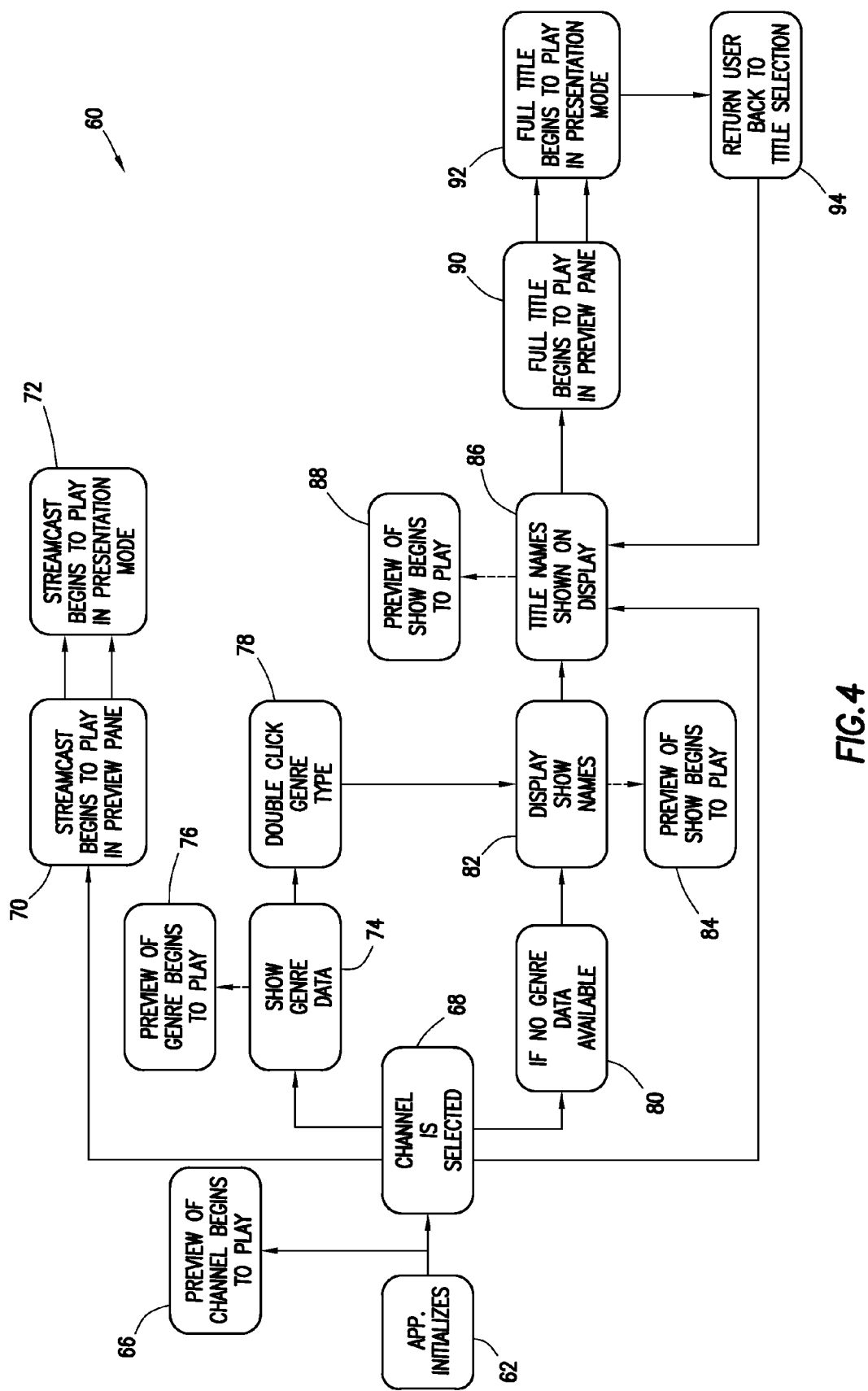
FIG. 4 shows a method in accordance with embodiments of the invention.

FIG. 4 provides a method 60 usable in conjunction with computer 12. As FIG. 4 is discussed, reference will be made to exemplary screen shots of FIGS. 5-8. At 62 a user of computer 12 initializes an application (e.g., code 24) to run on processor 20. The application initialized at 62 enables a user to view media content from the content providers 14 as well as the preview clips associated with metadata in metadata database 16. During or after the initialization process, the application downloads the relevant metadata from metadata database 16. In some embodiments, a user registers with one or more content providers. The metadata the user's application accesses pertains to the content provider(s) with which the user has registered. In other embodiments, a user need not register with the content providers. Channel lists can be pre-populated and may be pre-populated based on the geographical location of the user, based on content classifications (e.g., Motion Picture Association of America (MPAA) ratings), or based on other factors such as demographics. In some embodiments, all of the metadata associated with the user is downloaded at one time, while in other embodiments, parts of the relevant metadata are downloaded if, and when, needed. The metadata is used as discussed below with respect to the method illustrated in FIG. 4.

Figure 5:
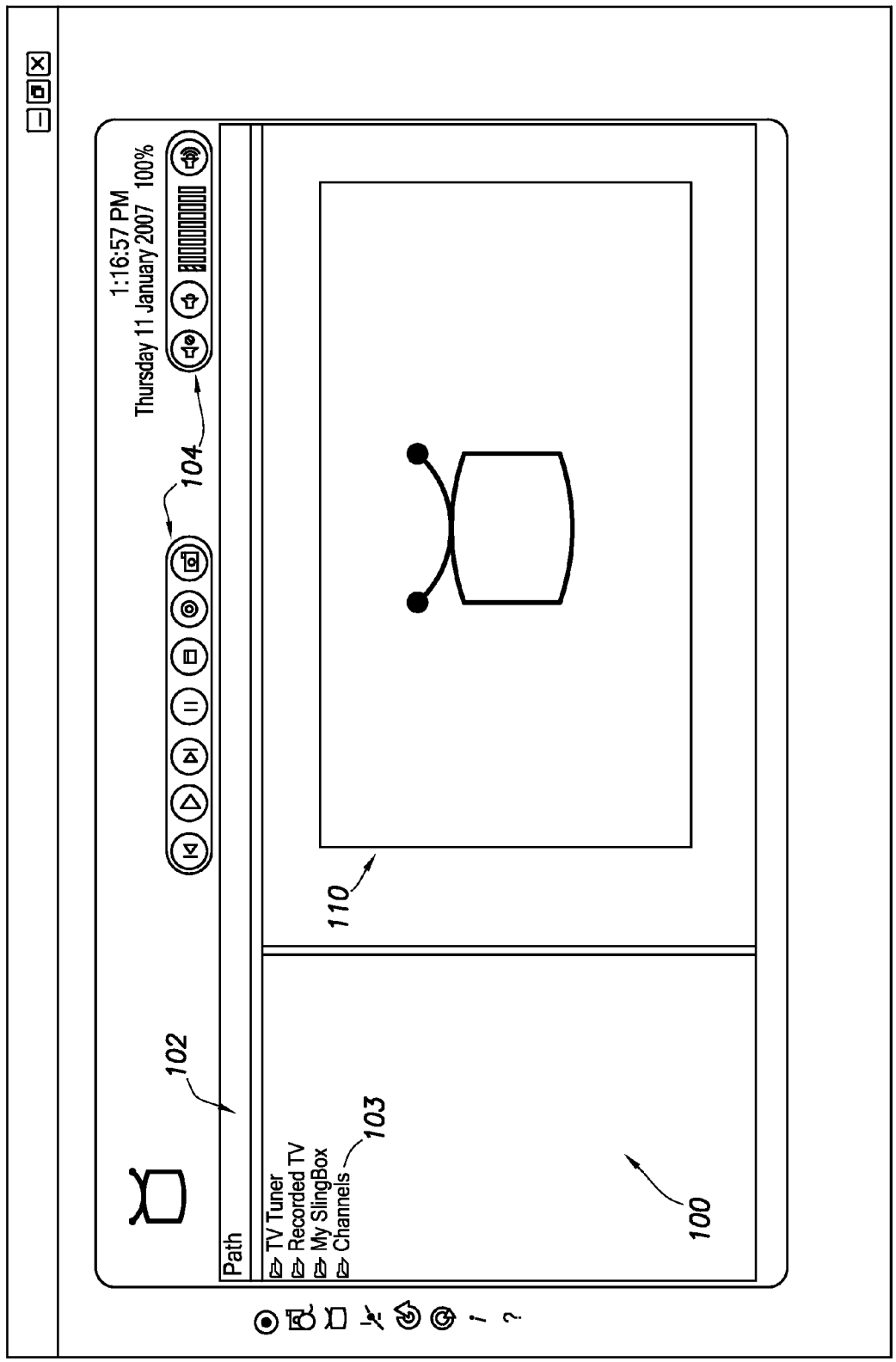
FIGS. 5-8 illustrates the operation of a content playback tool in accordance with embodiments of the invention.
Figure 6:
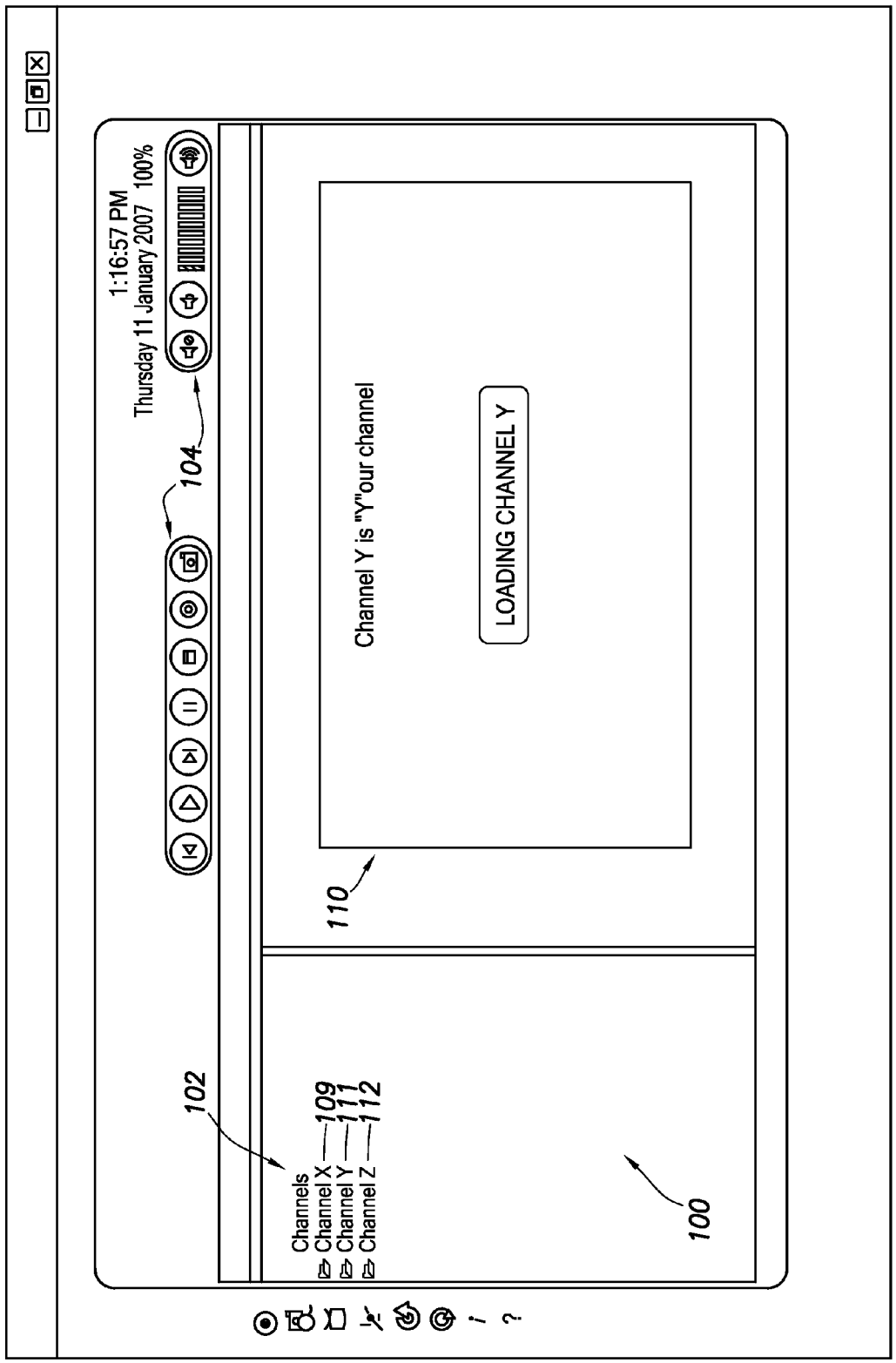

FIG. 5 shows a graphical user interface 100 comprising path information 102, playback controls 104, (e.g., Play, Pause, Volume, etc.) and a preview pane 110. The path information 102 comprises one or more icons that are individually selectable by a user of computer 12 via input device 28. As used herein the term "icon" comprises any alphanumeric or graphical representation shown on display 26 that a user can select with input device 28. As show in FIG. 5, path information 102 comprises, among other icons, a "channel" icon 103. FIG. 6 shows the path information 102 upon the user selecting the channel icon 103. As shown in the example of FIG. 6, icons 109, 111, and 112 are shown associated with channels X, Y, and Z as discussed above. Channel icons 109, 111, and 112 show the channel names 44a in some embodiments. Thus by selecting the channel icon 103, the graphical interface 100 identifies to the user that three channels (X, Y, and Z) are available to the user for playback on computer 12.

With the channel icons 109, 111, and 112 shown on graphical user interface 100, a user of computer 12 has multiple choices. One choice is for the user to, for example, "double click" one of the channel icons 109, 111, and 112. Upon double clicking the channel icon, the media content associated with that channel will begin to play on computer 12. Another choice is for the user to single click one of the channel icons 109, 111, and 112. By single clicking the channel icon, the underlying media content does not play. Instead, single clicking a channel icon causes the selected channel icon to be rendered in a different way than the other channel icons. For example, the selected channel icon is highlighted, bolded, or set apart from the other channel icons in any suitable graphical way. As used herein the term "focus" refers to the channel icon, or any other icon described herein, that has been selected and shown in a different graphical way than other icons.

In accordance with embodiments of the invention, the computer 12 will cause a preview clip associated with an icon in focus to begin playing after the associated icon has been in focus for more than a pre-determined period of time. In some embodiments, the pre-determined period of time comprises two seconds but the pre-determined period of time can be any suitable time period. Accordingly, the preview clips can be made to play upon the user causing an icon to be in focus. As such, a separate playback control need not be activated by the user to cause the preview clip to play. At any time, that a preview clip is playing and the user causes a different icon to be in focus, the computer 12 ceases playing the current preview clip and begins to play a preview clip associated with a new icon that is in focus for a pre-determined period of time. Once the computer 12 plays the entire preview clip, the graphical image (e.g., 44c, 48c, 50c, and 54c) associated with that particular icon is displayed on display 26. In other embodiments, the preview clip repeatedly plays until the user selects a different icon or causes a different action to occur (e.g., playing the media content to which the preview clip pertains).

Referring to FIG. 4, at 62 once the application initializes and the user has selected the channel icon 103, the user can cause one or more of the channel icons 109, 111, and 112 (FIG. 6) to be in focus. When in focus, the channel's metadata image 44b is show in preview pane 110. As explained above, once such a channel icon 109, 111, and 112 is in focus for more than a pre-determined period of time, then at 66 the associated preview clip begins to play in the preview pane 110. The user can view one or more preview clips 54c associated with the various channels. At 68, the user double clicks one of the channel icons 109, 111, and 112 displayed on display 26. The selected channel icon may be associated with video on demand or a streamcast in accordance with various embodiments. If the selected channel comprises a streamcast, then the associated streamcast begins to play at 70 in the preview pane 110. At 72, the streamcast can be made to play in a full screen mode upon the user activating a full screen mode.

At 68 the selected channel may alternatively comprise video on demand. As shown in FIG. 3, the video on demand may be characterized by genre metadata associated with the selected channel. If the selected channel comprises genre metadata, then at 74 the genre metadata information (e.g., genre name 48*a*) is shown in path 102 of the graphical user interface. As explained above, the genre metadata may also comprise a preview clip 48*c* associated with the genre. The user can cause the preview clip 48*c* associated with a particular genre to begin playing on display 26 by single clicking one of the genre types being displayed. Upon expiration of a pre-determined amount of time after the selected genre type has been in focus, the preview clip 48C associated with that genre type begins to play at 76. At 78, the user double clicks one of the genre types and at 82, the shows associated with the selected genre type are shown. In some embodiments, a selected channel at 68 does not comprise any genre metadata. Instead, the selected channel may be associated with one or more shows without any genre data. At 80, the computer 12 determines that no genre data is available for the selected show and then displays the "show" metadata in path 102 on graphical user interface 100 as illustrated by 82.

Figure 7:
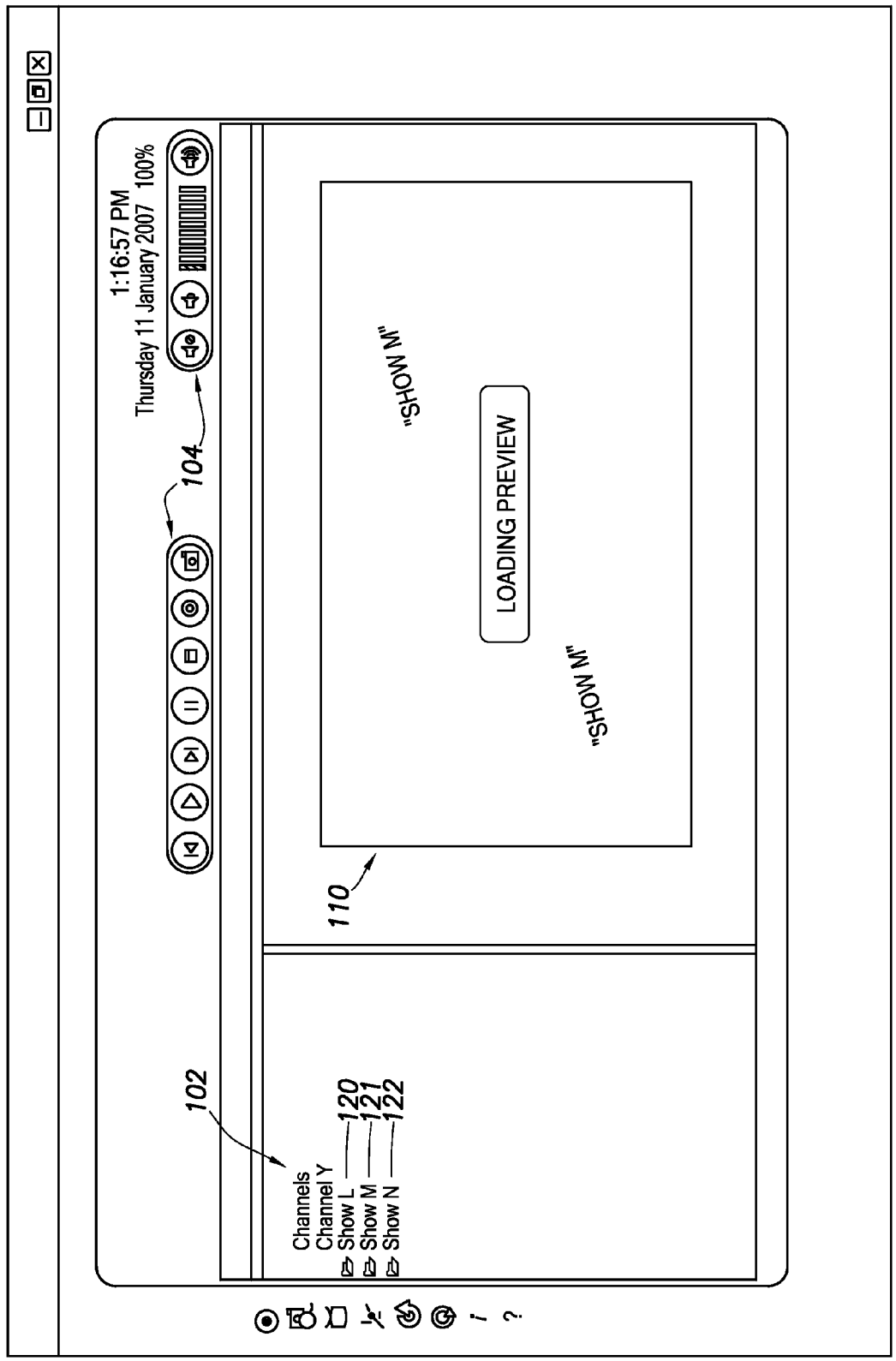

FIG. 7 shows that the user has selected channel Y which comprises metadata associated with shows L, M, and N. Thus, icons 120, 121, and 122 are shown in path 102 to identify the various shows L, M, and N associated with the selected channel Y. Icons 120-122 show the show names 50*a* in some embodiments. At 84, a preview clip 50*c* associated with one of the shows begins to play after a pre-determined amount of time following the user causing one of the show icons 120-122 to be in focus. Before the preview clip begins to play, but after the show icon is caused to be in focus, the image 50*b* of that show's metadata is displayed in preview pane 110.

Figure 8:
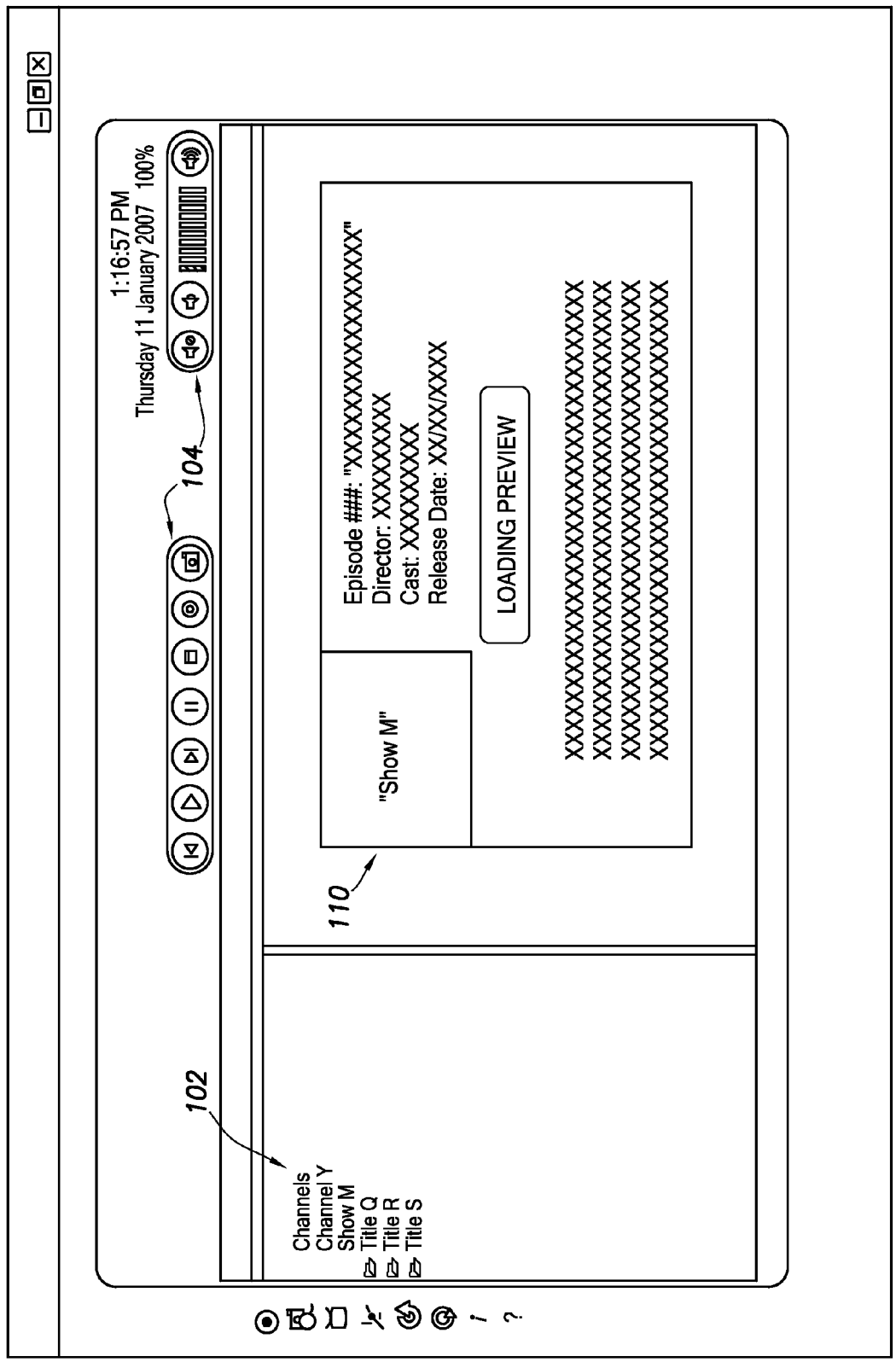

At 86, once the user has double clicked one of the show icons 120-122, the titles associated with the selected show are displayed in path information 102. FIG. 8 shows an example in which the user has selected show M and the associated titles Q, R, and S are then shown below show M. The titles comprise the title names 54*a*. As explained above with regard to the other icons, a preview clip 54*c* associated with a particular title begins to play at 88 after a pre-determined amount of time has expired following a user causing one of the title icons to be in focus. Before the preview clip begins to play, but after the title icon is made to be in focus, the image 54*b* of that title's metadata is displayed in preview pane 110.

At 62, a user may select a channel that has no genre metadata and no show metadata. Control passes to 86 in which the channel's titles are shown for selection by the user.

At 90, a user selects one of the titles to play by double clicking the associated title. The computer then begins to play the full media content from content providers 14 associated with the selected show in the preview pane 110 (action 90). Upon activating the action button, the full media content can be made to play in a full screen presentation mode at 92. Upon completion of the selected title, or if the user decides to stop playing the full media content, at 94, control loops back to 86 in which the image 54*b* associated with the previously selected title is shown in preview pane 110. At that point, the user can select a different title to play as desired.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a display on which an icon is displayed, said icon associated with a video clip and a media track, wherein said video clip plays for less time than said media track;
   logic coupled to said display, wherein, after, and in response to, the user single clicking the icon via a pointing device to place the icon in focus and leaving the icon in focus for a pre-determined amount of time, said logic automatically begins playing the video clip, and wherein, upon the user double clicking the icon via the pointing device, said logic automatically begins playing the media track.

2. The system of claim 1 wherein pre-determined amount of time is at least two seconds.

3. The system of claim 1 wherein said logic begins playing the video clip in a preview window on said display.

4. The system of claim 1 wherein the video clip comprises a preview clip associated with the media track.

5. The system of claim 1 wherein the video clip ceases playing when a different icon is in focus.

6. The system of claim 1 wherein said icon is associated with one of a channel identifier, genre type, show name, and title name.

7. The system of claim 1 wherein said logic receives metadata that comprises an identifier of the video clip.

8. A non-transitory computer-readable medium (CRM) comprising software that, when executed by a processor, causes the processor to:
   access a metadata database, the database comprising data about media organized in a hierarchy of shows and titles, with a number of titles associated with each show;
   display a user interface comprising icons representing at least some of the items in the hierarchy, each icon representing a different item in the hierarchy;
   automatically play a video clip from the database that is associated with an icon that is made in focus on a display by a single click of the icon; and
   upon a double click of the icon, automatically play a media track associated with the icon;
   wherein said media track plays for a longer period of time than the video clip.

9. The non-transitory CRM of claim 8 wherein said software causes said processor to automatically begin playing the video clip after the icon has been in focus for more than a threshold amount of time.

10. The non-transitory CRM of claim 8 wherein the video clip comprises a preview clip associated with a media track.

11. The non-transitory CRM of claim 8 wherein the software causes the processor to cease playing the video clip when a different icon is in focus.

12. The non-transitory CRM of claim 8 wherein the software causes the logic to receive metadata that comprises an identifier of the video clip.

13. The CRM of claim 8 wherein the hierarchy further comprises a number of channels, a number of shows associated with each channel and wherein the video clip associated with a channel is a preview of that channel.

14. The CRM of claim 13 wherein the hierarchy further comprises a number of genres, a number of genres being associated with each channel, and wherein the video clip associated with a genre is a preview of that genre.

15. The CRM of claim 8 wherein the accessed metadata for each item in the hierarchy comprises a name, an image and a preview clip.

16. A method, comprising:
   selecting an icon to be in focus via a single click; and
   automatically playing a video clip associated with the icon that is in focus on a display after, and in response to, the user leaving the icon in focus for a pre-determined amount of time;
   selecting the icon via a double click;

automatically playing a media track associated with the icon;
wherein said media track plays for a longer period of time than the video clip.

17. The method of claim 16 wherein the pre-determined amount of time is at least two seconds.

18. The method of claim 16 further comprising selecting an icon that is already in focus.

19. The method of claim 16 further comprising ceasing playing the video clip upon a different icon being in focus.

* * * * *